July 10, 1956 J. W. H. MORGAN 2,754,441
DYNAMOELECTRIC MACHINES
Filed Aug. 3, 1953

United States Patent Office 2,754,441
Patented July 10, 1956

2,754,441

DYNAMOELECTRIC MACHINES

John William Harold Morgan, Stafford, England, assignor to The English Electric Company Limited, London, England, a British company Application August 3, 1953, Serial No. 372,101

Claims priority, application Great Britain August 13, 1952

5 Claims. (Cl. 310—258)

This invention relates to dynamo-electric machines of the kind in which the stator core member is resiliently supported in the stator frame member.

It is an object of the invention to provide an improved resilient support for such a machine.

According to the invention, in such machine, the resilient support comprises, in combination, a plurality of sets of interconnecting links spaced longitudinally along the machine, each set consisting of a plurality of tangentially extending links spaced circumferentially around the core member, and, in the connection between each link and at least one of the members, a longitudinally extending bar which is rigidly secured to the link and to the member, the relative cross-section of the links and the bars being such that relative radial movement of the two members is resiliently restrained substantially wholly by said bars which are stressed in torsion by such movement.

Figure 1:
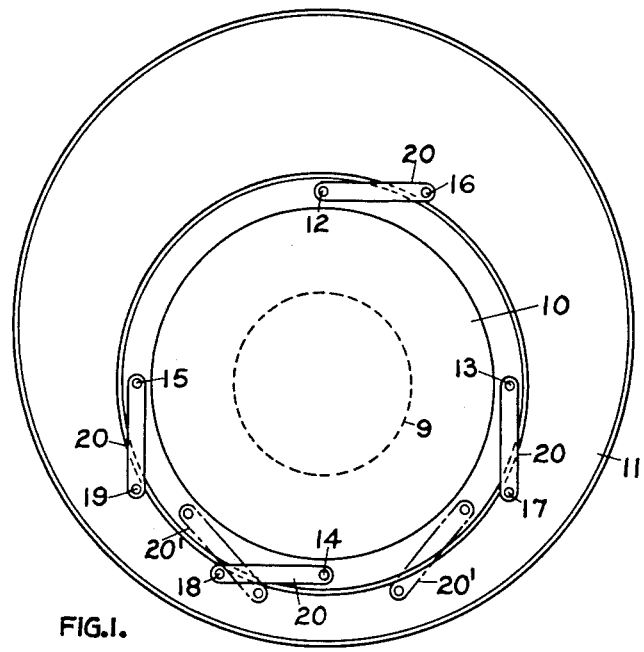
Figure 2:
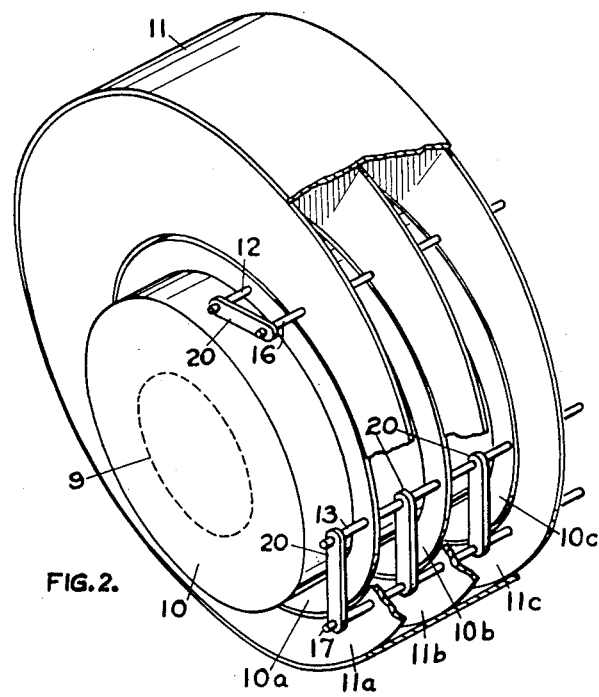

A preferred method of carrying out the invention as applied to a large turbo alternator is illustrated diagrammatically in the accompanying drawing. Fig. 1 is an end view of the alternator, whilst Fig. 2 is an isometric view partly broken away to show more clearly the resilient support.

Referring now to the drawing, the turbo alternator comprises a rotor 9 arranged to rotate within a laminated stator core 10 mounted in a fabricated stator frame 11. Axially extending bars 12, 13, 14 and 15 are equally spaced around the periphery of the stator core and are rigidly secured to circular ribs 10a, 10b and 10c in turn rigidly secured to the stator core. Similar bars 16, 17, 18 and 19 are rigidly secured to circular ribs 11a, 11b and 11c forming part of the stator frame. The two sets of bars are coupled together by a plurality of interconnecting links 20 disposed between the circular ribs and arranged to extend approximately tangentially to the periphery of the stator core. The links are rigidly secured to the respective bars. Sufficient radial clearance is provided between the two sets of circular ribs to allow radial movement of the stator core relative to the stator frame.

When acted upon by magnetic forces produced by the rotor, the stator core orbit will assume an elliptical shape, which shape will rotate at the speed of the rotor so that, taking any particular point on the periphery of the stator core, this point will undergo a cyclical displacement from its normal position in both the radial and the tangential directions.

From the foregoing it will be apparent that radial displacement will tend to rotate the links about their points of attachment with the bars 12 to 19. Since, however, these links are rigidly attached to the bars, the bars must twist to allow this movement which is therefore resiliently restrained by stressing the bars in torsion. The relative cross-section of the links and the bars is arranged to be such that this relative movement is substantially wholly resisted by the bars without any bending of the links.

In practice the tangential displacements will be small relative to the radial displacement and the bars may be arranged to provide greater resistance to tangential movement than to radial movement. The thickness of the links 20 in the axial direction of the machine is arranged to be such that the links can bend in this direction to allow a slight amount of axial movement of the stator core relative to the stator frame.

In order to protect the support against certain short circuit conditions, if it is undesirable to provide a support with sufficient stiffness to withstand these conditions, buffers may be provided to permit only a limited, safe deflection.

It will be appreciated that, whilst the invention finds its greatest application in large turbo alternators, it may also be applied to other machines where a similar degree of resilience is required.

What I claim as my invention and desire to secure by Letters Patent is:

1. In a dynamo-electric machine of the kind in which the stator core member is resiliently supported in the stator frame member, resilient support means for the core member comprising, in combination, a plurality of sets of interconnecting links spaced longitudinally along the machine, each set consisting of a plurality of tangentially extending links spaced circumferentially around the core member, and, in the connection between each link and at least one of the members, a longitudinally extending bar which is rigidly secured to the link and to the member, the relative cross-section of the links and the bars being such that relative radial movement of the two members is resiliently restrained substantially wholly by said bars which are stressed in torsion by such movement.

2. In a dynamo-electric machine of the kind in which the stator core member is resiliently supported in the stator frame member, resilient support means for the core member comprising, in combination, a plurality of sets of interconnecting links spaced longitudinally along the machine, each set consisting of a plurality of tangentially extending links spaced circumferentially around the core member, and, in the connection between each link and each of the two members, a longitudinally extending bar which is rigidly secured to the link and to the corresponding member, the relative cross-section of the links and the bars being such that relative radial movement of the two members is resiliently restrained substantially wholly by said bars which are stressed in torsion by such movement.

3. In a dynamo-electric machine of the kind in which the stator core member is resiliently supported in the stator frame member, resilient support means for the core member comprising, in combination, a plurality of pairs of circumferentially spaced longitudinally extending bars spaced circumferentially around the core member, one bar of each pair being rigidly secured at spaced intervals to the core member and the other bar of each pair being rigidly secured at spaced intervals to the frame member, and, for each pair of bars, a plurality of interconnecting links rigidly secured to the bars at positions between the points of connection of the bars with the respective core and frame members, the relative cross-section of the links and the bars being such that relative radial movement of the two members is resiliently restrained substantially wholly by said bars which are stressed in torsion by such movement.

4. In a dynamo-electric machine of the kind in which the stator core member is resiliently supported in the stator frame member, resilient support means for the core member comprising, in combination, a plurality of longitudinally spaced, outwardly extending, circumferential ribs rigid with the core member, a plurality of longitudinally spaced, inwardly extending, circumferential ribs rigid with the frame member, a plurality of pairs of circumferentially spaced longitudinally extending bars spaced circumferentially around the core member, one bar of each pair being arranged to pass through the ribs of the core member and being rigidly secured thereto and the other bar of each pair being arranged to pass through the ribs of the frame member and being rigidly secured thereto, and, for each pair of bars, a plurality of interconnecting links rigidly secured to the bars at positions between the ribs, the relative cross-section of the links and the bars being such that relative radial movement of the two members is resiliently restrained substantially wholly by said bars which are stressed in torsion by such movement.

5. In a dynamo-electric machine of the kind in which the stator core member is resiliently supported in the stator frame member, resilient support means according to claim 1, wherein the thickness of the links in the longitudinal direction of the machine is such that the links resiliently restrain relative longitudinal movement of the stator core member and the stator frame member.

References Cited in the file of this patent

UNITED STATES PATENTS

| | | |
|---|---|---|
| 2,424,299 | Baudry et al. | July 22, 1947 |
| 2,554,226 | Taylor | May 22, 1951 |